Nov. 3, 1931.    H. G. CARLSON    1,830,262
METHOD OF MAKING PIPE FITTINGS
Filed Sept. 21, 1928    4 Sheets-Sheet 1
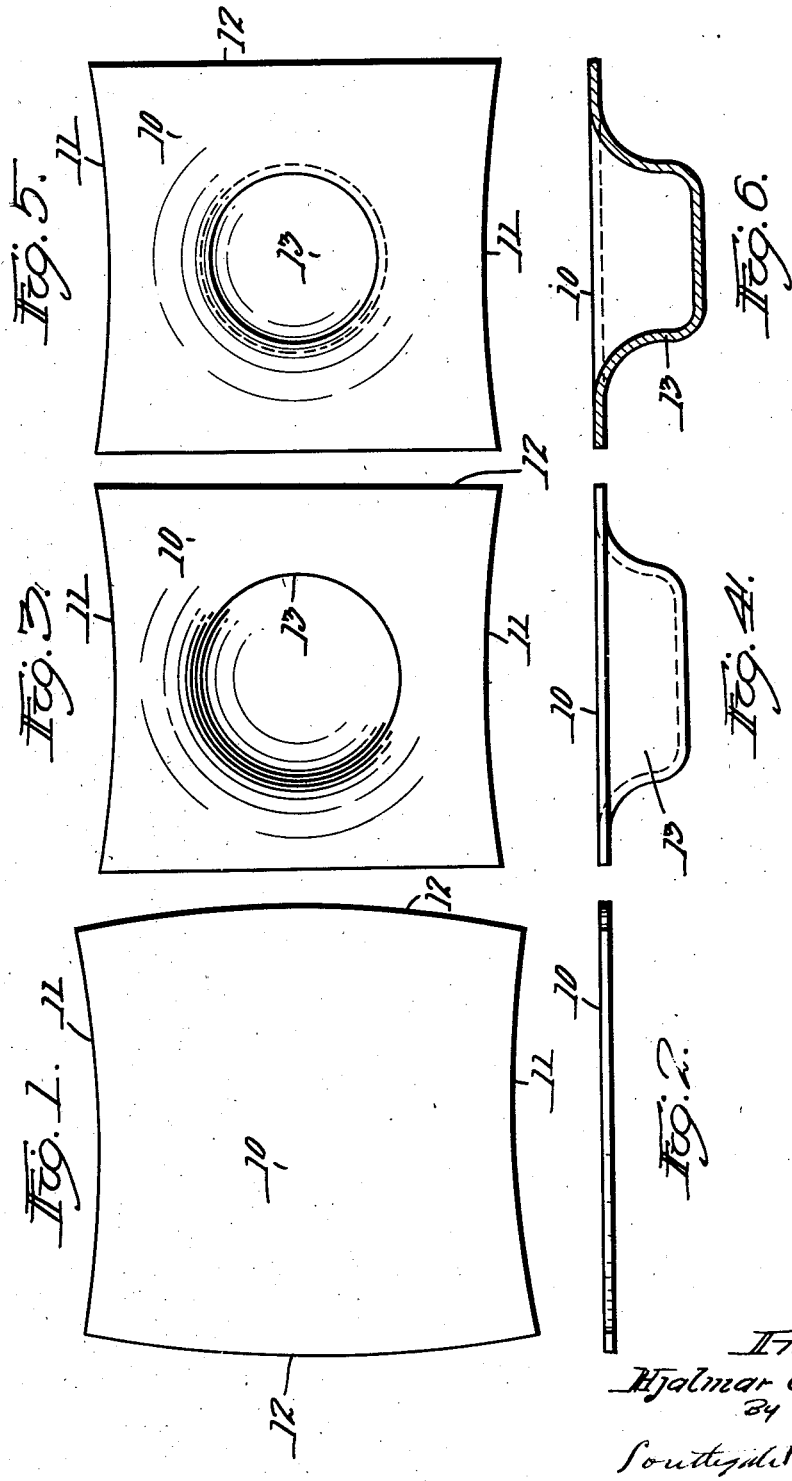

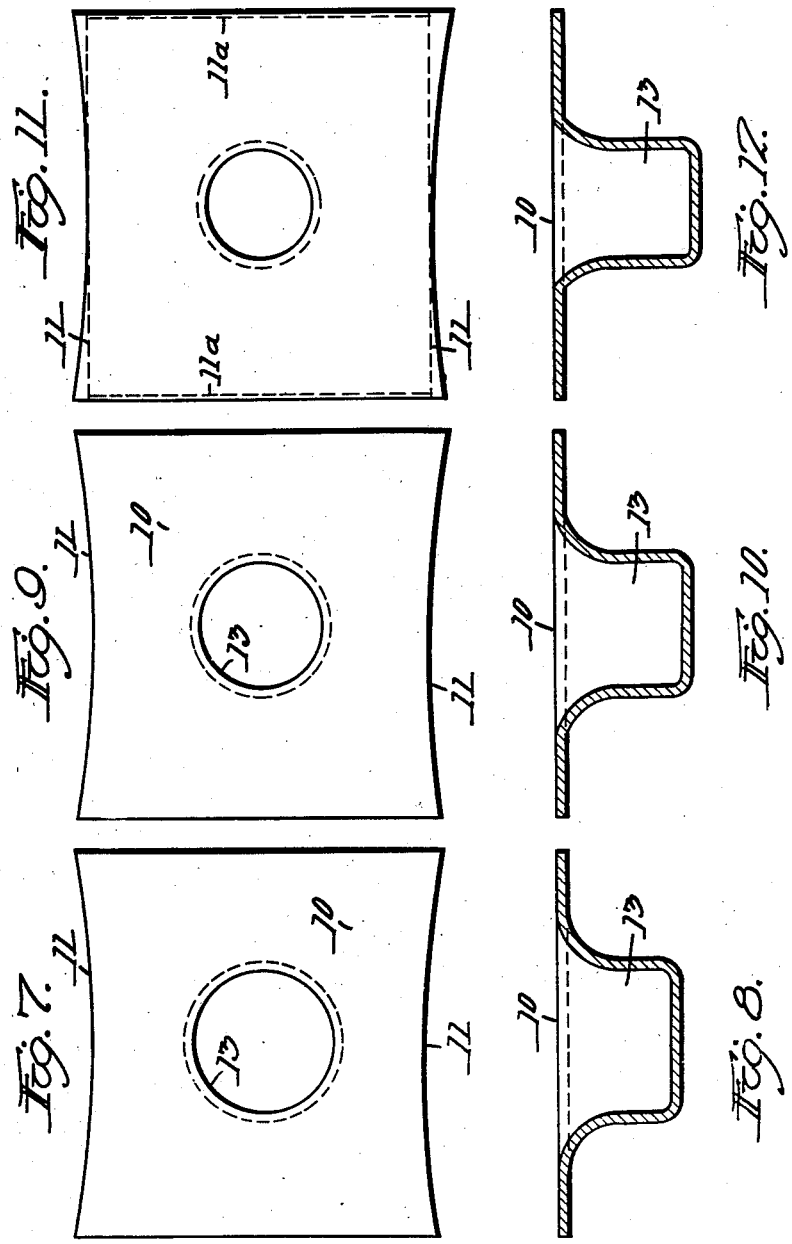

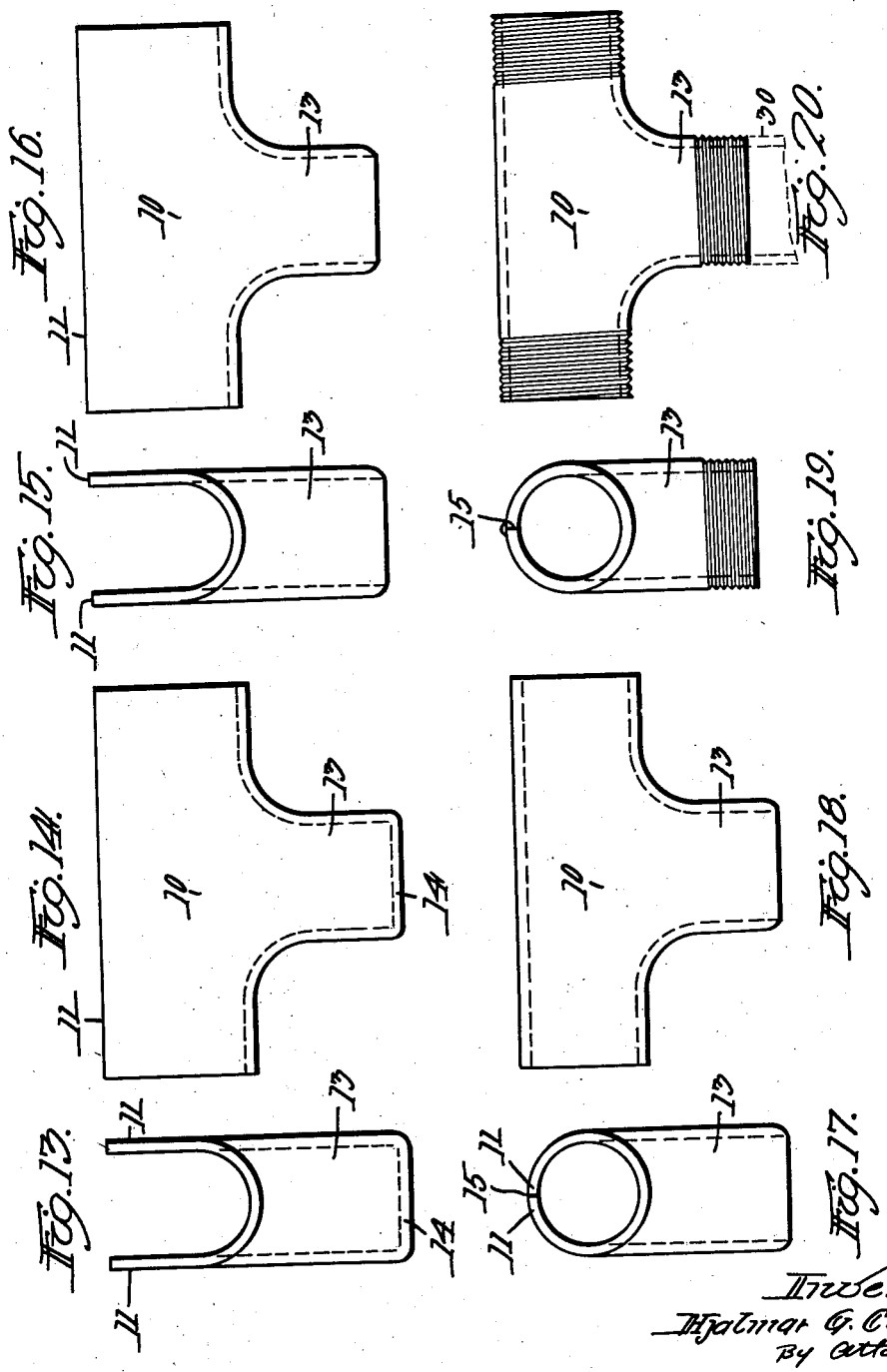

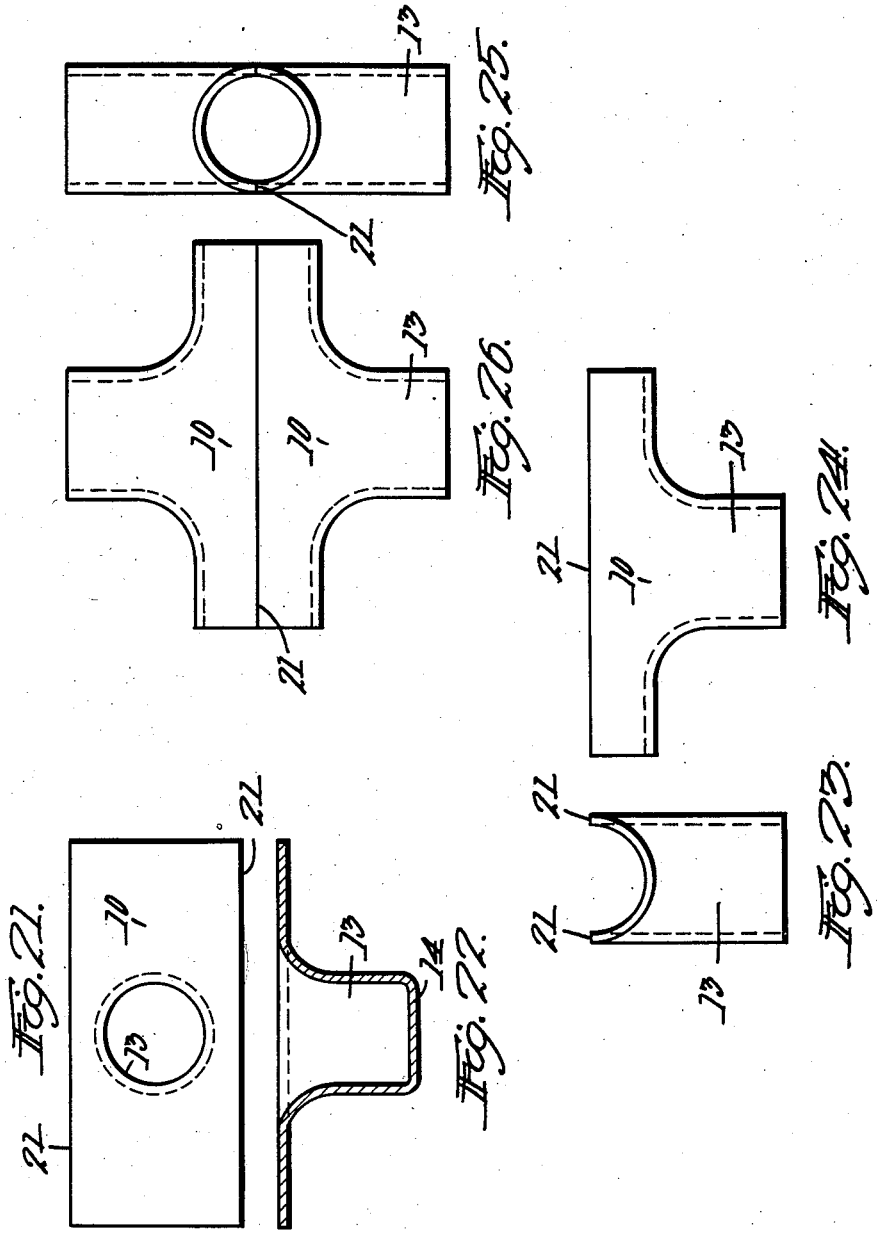

Patented Nov. 3, 1931

1,830,262

UNITED STATES PATENT OFFICE

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS

METHOD OF MAKING PIPE FITTINGS

Application filed September 21, 1928. Serial No. 307,515.

This invention relates to a method of making pipe fittings and the like of sheet metal. The principal objects of the invention are to provide a method by which a T or cross can be made of sheet metal with the help of a welding step, thus saving in cost of manufacture when they are made in large quantities and insuring absolute uniformity of the product; to provide an improved pipe fitting made by this method and to provide a pipe fitting which can be made of the same thickness as the pipe and butt welded to it or connected to it by standard couplings thus reducing the fitting to the size of the pipe.

The idea of making pipe fittings of sheet metal is not the extent of this invention. It involves the use of an original flat blank which does not result in waste of any material amount of metal and a series of steps in shaping the blank up to such form that a T, for example, can be made from a single blank or a cross from two blanks.

Other objects and advantages of the invention will appear hereinafter.

Reference is to be had to the accompanying drawings in which

Figs. 1 and 2 are a plan and edge view of the blank as it is originally cut out of a flat piece of sheet metal;

Figs. 3 and 4 are similar views showing the first operation;

Figs. 5, 6, 7, 8, 9, 10, 11 and 12 are plan and sectional views showing several steps in the drawings of the blank into condition for the formation of a T or cross;

Figs. 13 and 14 are respectively end and side views of the drawn up blank shown in Figs. 11 and 12, it having been bent into a shape from which a T can be formed;

Figs. 15 and 16 are similar views showing the bottom punched out of the cup and thus forming the side outlet of the T;

Figs. 17 and 18 are similar views showing the further bending of the blank into the form of a T;

Figs. 19 and 20 show the completion of the T by the welding of the joint at the back; they also show each outlet threaded, which of course, is a practical step only when the T is made of sheet metal of the thickness of the pipe to which it may be joined by a standard pipe coupling.

Figs. 21 and 22 are plan and sectional elevations respectively, showing the blank illustrated in Figs. 11 and 12 trimmed down to form half of a cross;

Figs. 23 and 24 are an end and side view of this blank and with the edges bent up to form exactly half of a cross;

Figs. 25 and 26 are similar views showing two of these blanks placed together edge to edge to be welded at these edges and complete the cross.

By this method, a substantially rectangular blank 10 is cut out of flat sheet metal having concave edges 11 opposite each other and convex edges 12 at their other sides. This blank is made convex along the edges 12 to provide a little surplus metal to permit of the first drawing out operation which is shown in Figs. 3 and 4. Here the blank is shown as being drawn out to form a hollow projection 13 which is located in the center and the metal required for it is obtained from the metal along the convex edges 12 and also by drawing in and further concaving the edges 11. This is then subjected to a series of similar operations in each of which the projection 13 is made deeper and narrower as shown in Figs. 5 to 12 inclusive.

In Fig. 11 is shown in dotted lines the trimming of this blank straight on two sides 11ª and slightly convex on other two sides 11. It will be understood that the relationship between the sides and ends of this blank depends upon the kind of a fitting that is to be made. The one being described now is a T and in Figs. 13 and 14 is shown the first step which makes this blank into such form that a T is suggested. The edges 11ª, which were trimmed off straight in Fig. 11, are bent up toward each other into parallel planes, as shown in these two figures, so that we have a blank now which resembles a T with semi-cylindrical ends.

The next step is to cut out the bottom 14 so as to provide an opening at that point, as clearly illustrated in Figs. 15 and 16. Now the straight edges 11 are bent over toward each other to form a complete cylinder as shown in Figs. 17 and 18, meeting at a line 15. The curvature of the edges 11 is such that the ends of the T will be flat.

The next step in the process consists in welding the blank along the two edges 15 so as to form a complete blank as shown in Figs. 19 and 20, for the pipe fitting. In Fig. 20 the pipe threads are shown as being added to complete the fitting.

It will be seen that there are two principal series of operations; the drawing out of the blank to form a hollow projection, which constitutes the central branch of the completed T, and the bending of the edges 11 into a cylindrical form which form the other two ends of the T. There also is the trimming operation, which is indicated in Fig. 11, and the welding operation just described.

It is desirable to select metal for the original blanks of such a thickness as to make the walls of the completed fitting equal in thickness to that of the steel piping to which it is to be attached. The actual attaching may then be done either by the use of standard couplings or pipe flange screwed on to the threaded ends of the T, as shown, or by omitting the threads on the T and simply arc welding the pipe flange or pipe and fitting together as indicated at 30 in Fig. 20.

It is found in practice that this is a strong and durable construction; that very little metal practically is wasted in its formation; that it requires no machining, except the threading of the ends; and that these all come out uniform and exact.

The cost of production is greatly reduced when they are made in large quantities after suitable dies are provided for performing the several operations. Each operation, except the threading and the welding, is almost instantaneous and even these two operations are very quickly performed. There is no difficulty in centering the T to thread its ends because the outlets are always true cylinders and the metal is of uniform thickness throughout the fitting and of the same strength as that of the pipe, while the two ends are necessarily in alignment. This constitutes a very material advance in the art of making pipe fittings, as compared with present methods of making them, because sheet metal fittings are stronger, lighter and truer than cast iron fittings.

Although only one fitting has been described, the method is suitable for making other forms and in the other figures on the last sheet is shown a way in which this method can be employed with simple modifications to make a cross. For this purpose the blank in the condition shown in Figs. 11 and 12, but perhaps not of the same size, is trimmed along the edges 11 to form two straight edges 21 which are not as far apart proportionately as in Fig. 11, leaving the blank as shown in those two figures. Now these two edges are turned up by bending to form a semi-cylinder at each end, as shown in Figs. 23 and 24.

This blank is similar to one constituting one half of a T and two blanks produced in the same way are placed edge to edge as shown in Figs. 25 and 26 and welded along the edges 21. Of course the bottom 14 is punched out as in Figs. 15 and 16. The operation in Figs. 23 and 24 is the same as that shown in Figs. 13 and 14. This produces a blank for a cross which can be threaded on the four ends if desired.

Although I have illustrated and described only two ways of carrying out the method, and shown it as designed for the production of only two different types of fittings, I am aware of the fact that other modifications can be made therein for the purpose of making the same kind of fittings or other kinds without departing from the scope of the invention as expressed in the claims. Therefore, I do not wish to be limited to all the details of construction herein shown and described, or to these two fittings, but what I do claim is:

1. The method of making a pipe fitting which involves the cutting out of a blank of sheet metal in flat substantially rectangular form, forming a projection on said blank at one side thereof, drawing out said projection by a series of drawing operations to shape it to the size of the central projection of the pipe fitting it is desired to make, each drawing operation reducing the diameter of the projection and increasing its length, trimming the edges to give exactly the right amount of metal, bending the edges to provide a semi-cylindrical shape transverse to the axis of said projection and finishing the blank.

2. The method of making a pipe fitting which involves the cutting out of a blank of sheet metal in flat form with a pair of opposite concave edges and a pair of opposite convex edges, forming a projection on said blank at the center thereof, drawing out said projection to shape it to the size of the central projection of the pipe fitting it is desired to make by a series of drawing operations, each one reducing the diameter of the projection and increasing its length, thus slightly increasing the concavity of the concave edges and practically straightening out the convex edges, trimming the edges to give exactly the right amount of metal, bending the edges to provide a semi-cylindrical shape transverse to the axis of said projection and finishing the blank.

3. The method of making a pipe T which involves the cutting out of a blank of sheet metal in flat form with a pair of opposite concave edges and a pair of opposite convex edges, forming a projection in said blank at the center thereof, drawing out said projection to shape it to the size of the central projection of the pipe fitting it is desired to make by a series of drawing operations each one reducing the diameter of the projection and increasing its length, thus slightly increasing the concavity of the concave edges and practically straightening out the convex edges, trimming the edges to give exactly the right amount of metal, bending the edges to provide a semi-cylindrical shape transverse to the axis of said projection, cutting out the bottom of said projection, bending the said edges into contact with each other to form a complete cylinder and welding the edges along their contacting surfaces.

4. The method of making a pipe T which involves the cutting out of a blank of sheet metal in flat form, forming a projection in said blank at the center thereof, drawing out said projection to shape it to the size of the central projection of the pipe fitting it is desired to make by a series of drawing operations each one reducing the diameter of the projection and increasing its length, trimming the edges to give exactly the right amount of metal, bending the edges to provide a semi-cylindrical shape transverse to the axis of said projection, cutting out the bottom of said projection, bending the said edges into contact with each other to form a complete cylinder and welding the edges along their contacting surfaces.

5. The method of forming a pipe fitting comprising the cutting out of a four sided blank in flat sheet metal, forming a depression at the center thereof, drawing out said depression by a series of drawing operations to increase the depth and decrease the diameter to the diameter of the desired pipe fitting, cutting out the bottom of said depression, trimming the edges of the blank to the desired dimension, and bending said edges into two semi-cylinders, forming a second blank in the same way and abutting the edges against the edges of the first blank and welding the two seams along the edges to form a cross shape blank suitable for having its ends threaded thereafter.

In testimony whereof I have hereunto affixed my signature.

HJALMAR G. CARLSON.